United States Patent [19]

Cucchi et al.

[11] Patent Number: 4,899,352

[45] Date of Patent: Feb. 6, 1990

[54] SYSTEM AND DEVICE TO INTERFACE ASYNCHRONOUS APPARATUSES

[75] Inventors: Silvio Cucchi, Gaggiano; Vittorio Corradi, Monza, both of Italy

[73] Assignee: Telettra Telefonia Elettronica e Radio S.p.A., Milan, Italy

[21] Appl. No.: 100,022

[22] Filed: Sep. 23, 1987

[30] Foreign Application Priority Data

Sep. 25, 1986 [IT] Italy .............................. 21810 A/86

[51] Int. Cl.4 ............................................. H03K 5/135
[52] U.S. Cl. ..................................... 375/118; 369/60
[58] Field of Search ................ 375/106, 118; 370/108; 360/54; 358/19, 149; 369/60; 381/32, 33, 34

[56] References Cited

U.S. PATENT DOCUMENTS

| | | | |
|---|---|---|---|
| 4,271,483 | 6/1981 | Baldwin et al. ...................... | 370/108 |
| 4,348,754 | 9/1982 | Haynes et al. ......................... | 369/60 |
| 4,429,386 | 1/1984 | Graden ................................. | 370/108 |
| 4,661,966 | 4/1987 | Schreiner ............................. | 375/118 |

Primary Examiner—Benedict V. Safourek
Attorney, Agent, or Firm—Ostrolenk, Faber, Gerb & Soffen

[57] ABSTRACT

A system for interfacing asynchronous machines. The system includes a single-port RAM (Random Access Memory) synchronized with the master clock of only one of the asynchronous machines, and a FIFO (first in/first out) memory. The devices to implement this system consist of a single-port RAM, an FIFO memory, two counters, one of which is a write counter and the other is a read counter, a multiplexer which selects one of the two counters, and a RAM access control logic which generates the RAM control signals and the counter enabling signals and the above mentioned multiplexer select signal.

5 Claims, 5 Drawing Sheets

SYSTEM AND DEVICE TO INTERFACE ASYNCHRONOUS APPARATUSES

BACKGROUND OF THE INVENTION

1. Field of the Invention

The present invention is directed to a system for interfacing two asynchronous machines by using a single-port RAM synchronized with the master clock of only one of the machines. The invention also relates to devices to implement such a system.

2. Description of the Related Art

The simplest way known to interface asynchronous equipment, i.e. two machines each operating with independent master clock signals (CKsource, CKchannel, with frequencies FCKsource and FCKchannel, respectively) is to utilize a dual-port RAM, to which the clock signals of the two systems direct 14 access. This conventional system is shown in FIG. 1 where, for purposes of clarity, the two asynchronous machines are not represented, but instead are indicated by the signals they exchange with a dual-port RAM 2. However, this type of memory (dual-port RAM) has at least two significant disadvantages:

(i) Higher access time as compared to a single-port RAM. The maximum operating frequency of dual-port RAM's is on the order of 10 MHz. This is insufficient, for example, for video applications (with frequencies ranging from 15 MHz and higher).

(ii) Costs and consumption are considerably higher as compared to single-port RAM's. This disadvantage becomes particularly critical when large memory dimensions are required. In fact, at present, only a small quantity of dual-port RAM's are available on the market.

SUMMARY OF THE INVENTION

The main object of this invention is to provide a system which overcomes the above-noted disadvantages.

A further object is to provide devices for implementing such a system, having optimal components from the point of view of cost, size, simplicity etc.

The system of the present invention essentially consists of: (i) a single-port RAM synchronized with the master clock of only one of the two asynchronous machines and, (ii) a FIFO memory.

In one embodiment of the invention, the system is implemented with a single-port RAM, a FIFO memory, two counters, one of which is a write counter and the other is a read counter, a multiplexer (MUX) selecting one of the two counters, and RAM access control logic which generates the RAM control signals as well as the counter enabling signals and the multiplexer select signal.

DETAILED DESCRIPTION OF THE PREFERRED EMBODIMENTS

The advantages of the system and devices of the present invention are realized when a discrepancy occurs between the average frequency for writing requests from the upstream system (source) and the average frequency for reading requests from the downstream system (channel), which ordinarily occurs quite frequently.

In other words, the invention is directed to address a situation in which the source clock and the channel clock are operating at frequencies different from each other. The single-port RAM of the present invention must be synchronized at the higher of the two frequencies (FCKsource or FCKchannel). That is:

$$FCKram = MAX(FCKsource, FCKchannel)$$

Figure 1:
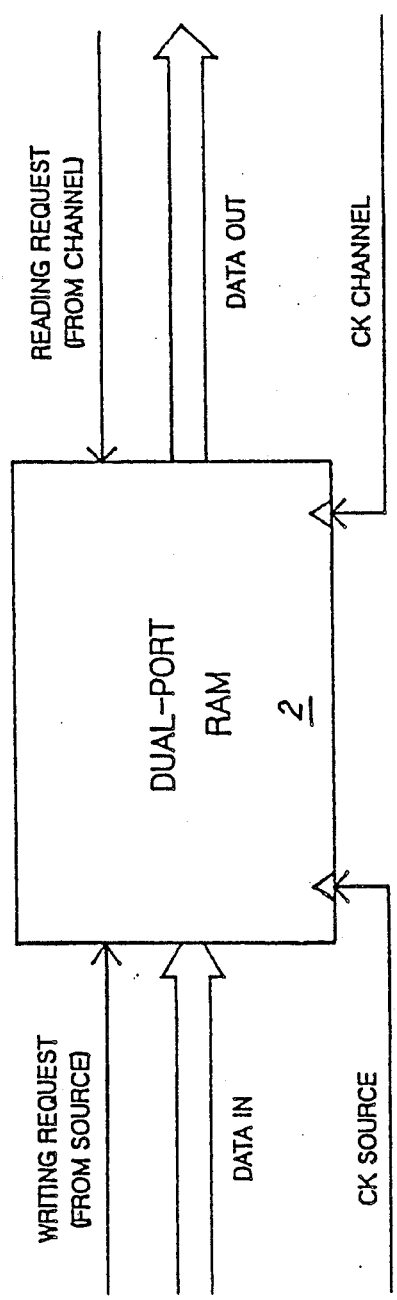
FIG. 1 shows a conventional dual-port RAM for interfacing asynchronous equipment.
Figure 2:
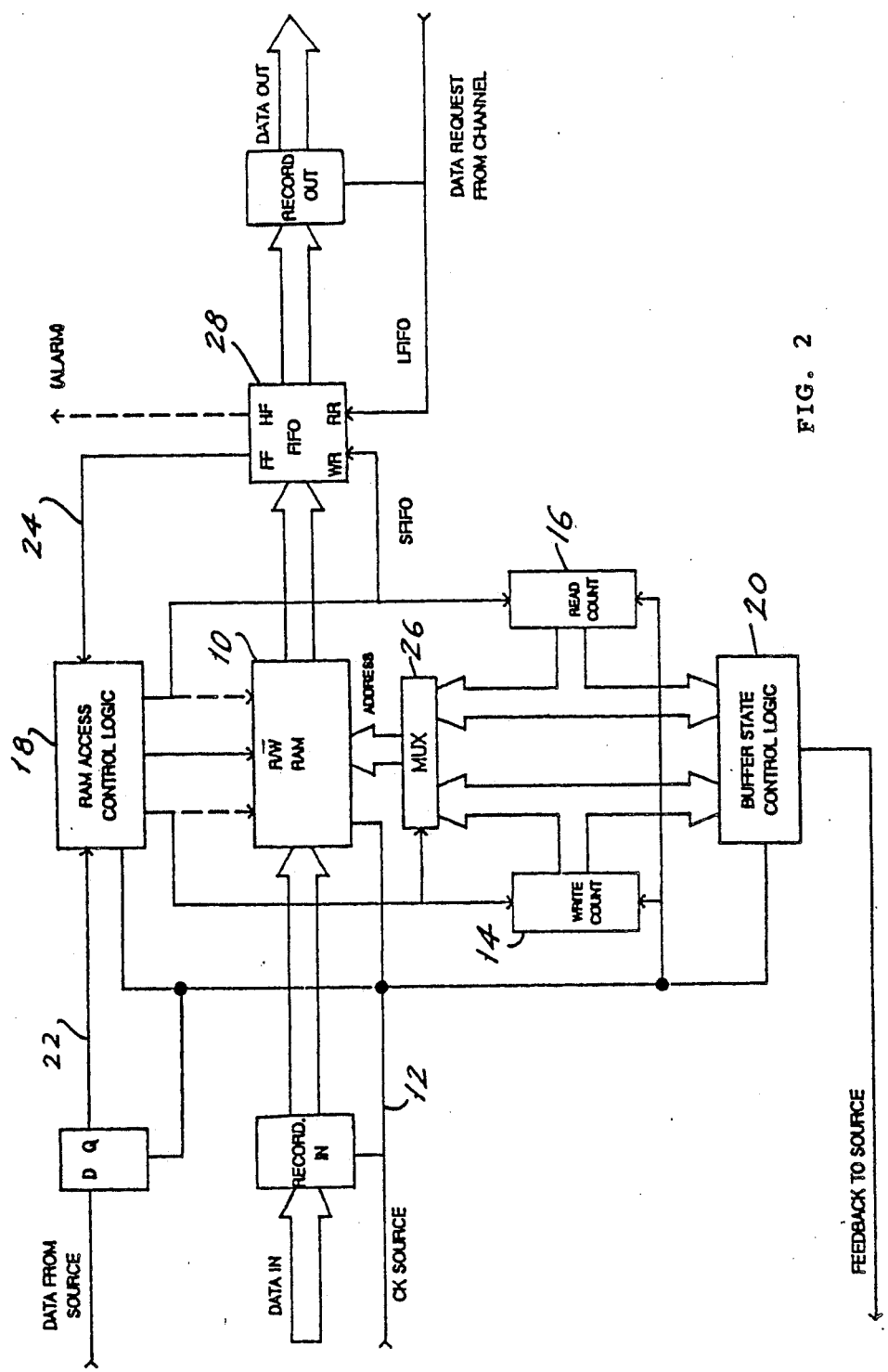
FIG. 2 is a block diagram of the transmit end of a device for the situation in which FCKsource>FCKchannel.
Figure 3:
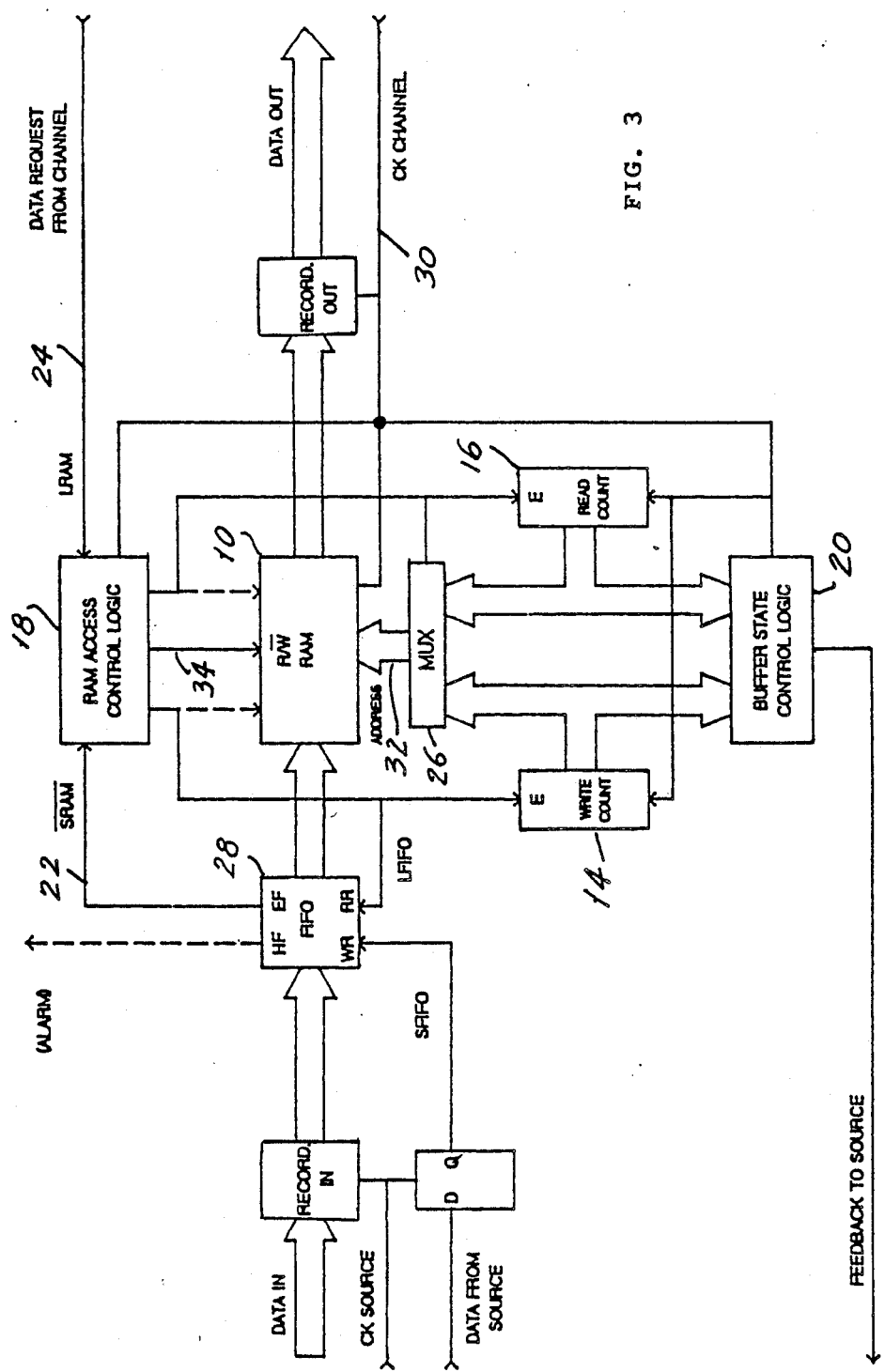
FIG. 3 is a block diagram of the transmit end of a device for the situation in which FCKsource<FCKchannel.
Figure 4:
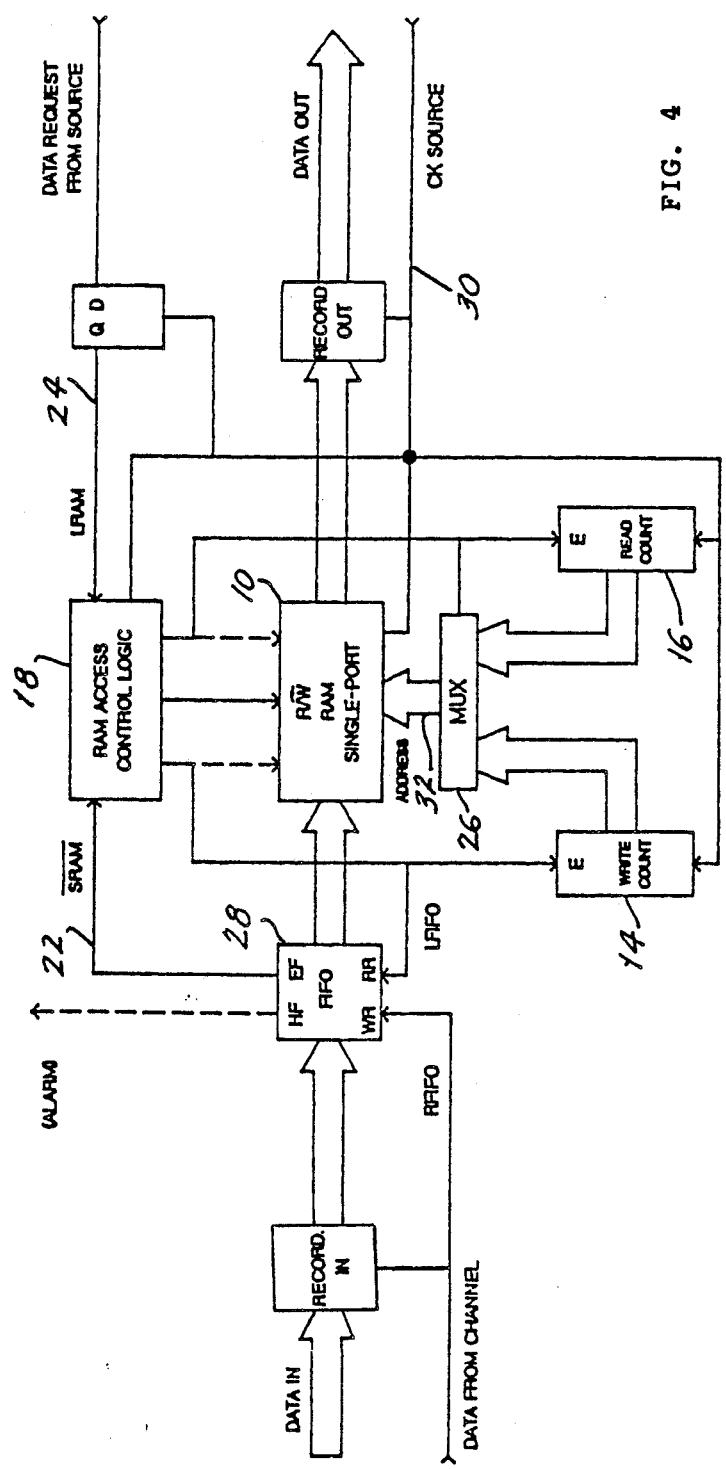
FIG. 4 is a block diagram of the receive end of a device for the situation in which FCKsource>FCKchannel.
Figure 5:
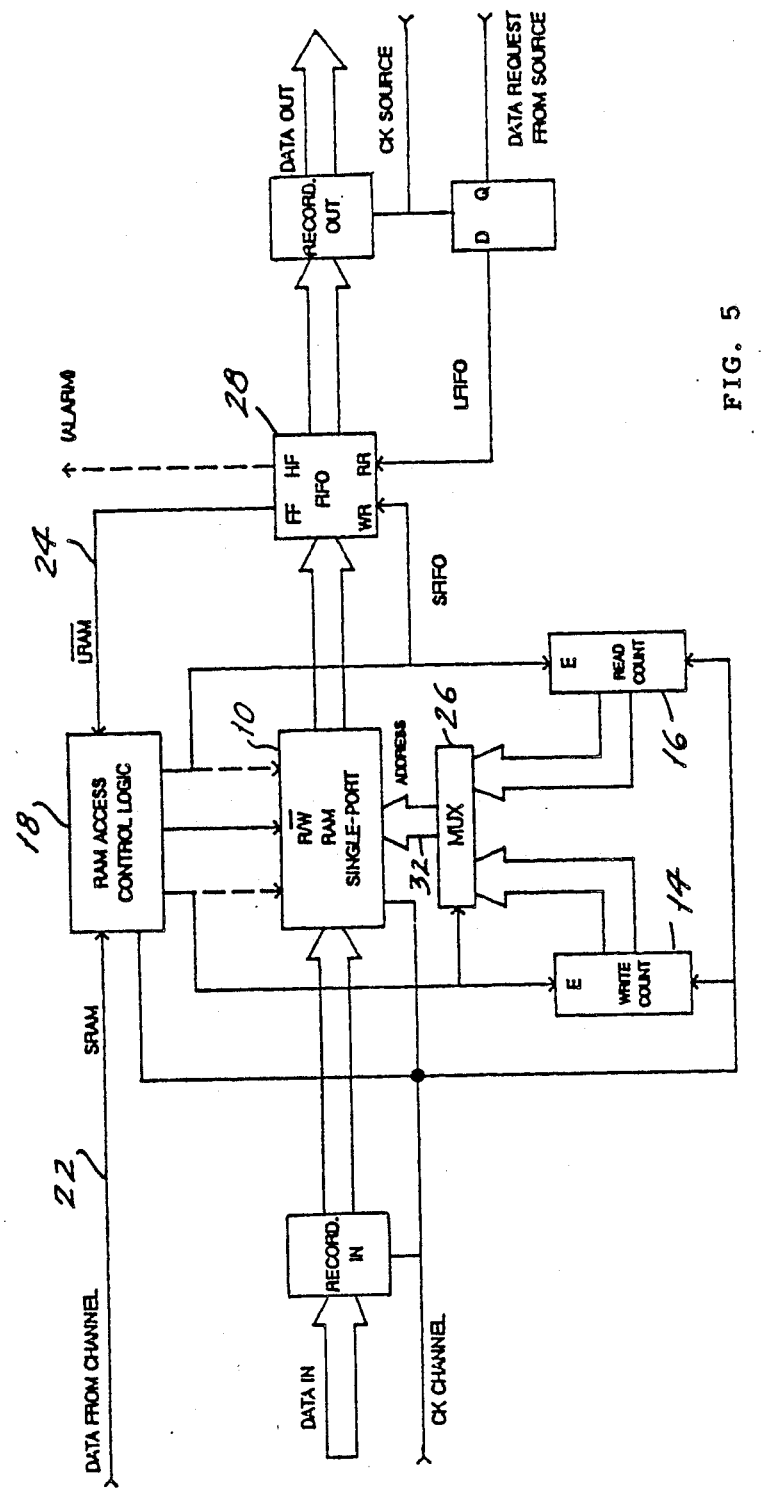
FIG. 5 is a block diagram of the receive end of a device for the situation in which FCKsource<FCKchannel.

This gives rise to two different devices (DEVICE A of FIGS. 2 and 4, DEVICE B of FIGS. 3 and 5). The first device (shown in FIGS. 2 and 4) is designed for the case when FCKsource is greater than FCKchannel, hence, CKram=CKsource. The second device (shown in FIGS. 3 and 5) is designed for the case when FCKsource is less than FCKchannel, hence, CKram=CKchannel. The two devices are analyzed as follows:

DEVICE A

A block diagram of the transmit end of DEVICE A is shown in FIG. 2. Since FCKsource>FCKchannel, the single-port RAM 10 must be synchronized with the CKsource 12, as must the two counters (write counter 14 and read counter 16), the RAM access control logic 18, and the buffer state control logic 20. Upon each CKsource cycle, the RAM access control logic 18 examines the writing request 22 and the reading request 24.

If present, the writing request is always satisfied first. This is carried out by the generation of RAM controls, selecting, through the multiplexer (MUX) 26, the write counter 14.

The reading request is satisfied only if writing is not occurring. It is generated by FIFO state flags 24 (e.g. FULL FLAG=0); then the RAM access control logic 18 supplies the RAM 10 with the controls selecting, through MUX 26, the read counter. In addition, the FIFO 28 receives the generated writing request which can also be satisfied since the FIFO memory is not full.

Obviously, the FIFO memory 28 can always satisfy the reading requests from the channel provided it is not in an underflow state. With referring to FIG. 2, the following equations are valid:

$$FSram = \alpha FCKsource \qquad (2a)$$

$$FLram = (1-\alpha)FKsource \qquad (2b)$$

$$FLram = FSfifo \qquad (2c)$$

$$FLfifo = \beta FCKchannel \qquad (2d)$$

Where the symbols have the following meaning:
FSram = RAM writing frequency.
FLram = RAM reading frequency
FSfifo = FIFO writing frequency
FLfifo = FIFO reading frequency Equations (2a) and (2b) summarize the operation of the RAM access control logic 18.

Factors $\alpha$ and $\beta$ appearing in equation (2) have the following meaning:

$$\alpha = \frac{FSram}{FCKsource} \qquad (3a)$$

$$\beta = \frac{FLfifo}{FCKchannel} \qquad (3b)$$

Both have values between 0 and 1.

The correct operation of the system is based on the condition that when it received a reading request from the channel, the memory 28 always has a message to be supplied at disposal.

Apart from any feedback of the memory on the source, this means that the FIFO memory 28 will never reach the underflow state.

This can be assured by:

$$FSfifo > FLfifo \qquad (4)$$

The FIFO memory 28 should be dimensioned accordingly (i.e. its capacity should be increased) by introducing, where necessary, a feedback alarm signal.

On the basis of equation (2), equation (4) becomes:

$$(1 - \alpha) FCKsource > \beta FCKchannel$$

$$\alpha < 1 - \beta \frac{FCKchannel}{FCKsource} \qquad (5)$$

As a numeral example:
$\beta = 493/511$
FCKchannel = 2.148 MHz From where (5): $\alpha < 0.923$
FCKsource = 27 MHz The equipment (source and channel) characterized by the above exemplary specifications can be interfaced with the system of the present invention when the source transmits information less than 92.3% of the time on the average. The more often this limit is satisfied, the smaller the FIFO memory may be.

DEVICE B

FIG. 3 shows a representative block diagram of the transmit end of DEVICE B.

Here, since FCKsource < FCKchannel, the RAM 10 must be synchronized with CK channel 30 and so must the two counters (write counter 14 and read counter 16), the RAM access control logic 18 as well as the buffer state control logic 20.

Upon each CKchannel cycle, the RAM access control logic 20 examines the writing request 22 and reading requests 24.

If present, the reading request 24 is always satisfied first. This is carried out by generating the adequate RAM controls, by selecting, through the MUX 26, the read address 32 and by incrementing the relevant counter (read counter 16). The writing request is satisfied only whenever it is present alone; it is generated by the FIFO state flags 22 (e.g. EMPTY FLAG = 0). In this case, the RAM access control logic 18 generates the RAM controls 74 by selecting, through MUX 26, the write address 32 and by incrementing the write counter 14.

In addition, the FIFO reading request 24 is generated, which can be satisfied because the FIFO memory 28 is not empty.

So it is clear that the FIFO memory 28 can always satisfy the reading requests 24 from the channel, provided it is not in an overflow state.

With reference to FIG. 3 and to the above statements, the following equations are valid:

$$FSfifo = \alpha FCKsource \qquad (6a)$$

$$FLfifo = FSram \qquad (6b)$$

$$FSram = (1 - \beta)FCKchannel \qquad (6c)$$

$$FLram = \beta FCKchannel \qquad (6d)$$

The symbols have the same meaning as previously described. Equations (6c) and (6d) summarize the operation of the RAM access control logic 18.

In this case, the condition on which the correct operation of the system is based, is that upon receiving a writing request 22 from the source, the elastic memory is always capable of storing the new message.

Apart from any elastic memory feedback on the source, this means that the FIFO memory 28 never reaches am overflow condition.

This will be assured by:

$$FSfifo < FLfifo \qquad (7)$$

The FIFO memory should be dimensioned accordingly (i.e. its capacity should be increased) by introducing, where necessary, a feedback alarm signal.

On the basis of equations (6), equation (7) becomes:

$$\alpha FCKsource < (1 - \beta)FCKchannel$$

$$\beta < 1 - \alpha \frac{FCKsource}{FCKchannel} \qquad (8)$$

At the receive end, the relevant devices are specular with respect to the above mentioned ones (see FIGS. 4 and 5).

Especially when at the transmit end, the FIFO memory 28 is in an almost empty or almost full state, the opposite would occur at the receive end. The above stated procedure is repeated in order to exchange the writing and reading, as well as the relevant FIFO and RAM commands.

If the receive end is correctly locked, the device operates without the need for an alarm (and feedback).

Another advantage of the proposed system lies in the fact that the RAM 10 is fully synchronous and so are the counters 14, 16 which provide the reading and writing addresses.

Any check of the elastic memory (hence feedback on the source) which is necessary is easier because the counters are synchronous, rather than asynchronous (with uncertain transitions).

This function (not part of the invention) is performed by the buffer state control logic 20 (appearing in FIGS. 2 and 3).

Although the present invention has been described in connection with preferred embodiments thereof, many modifications and variations will now become apparent to those skilled in the art. It is preferred, therefore, that the present invention be limited not by the specific disclosure herein, but only by the appended claims.

What is claimed is:

1. A system for interfacing asynchronous equipment operating a different clock frequencies, comprising:
   (a) a single-port RAM synchronized with the clock of the asynchronous equipment having the higher frequency;
   (b) a FIFO memory coupled to said single-port RAM; and
   (c) priority logic which controls read/write access to said single-port RAM from said asynchronous equipment and which, in the event of a conflict arising from simultaneous read/write requests from said asynchronous equipment, gives the request from the asynchronous equipment having a higher clock frequency priority access to said single-port RAM, the request from the asynchronous equipment having a lower clock frequency being fulfilled by read/write to said FIFO memory.

2. A system for interfacing asynchronous equipment comprising a source and a channel operating a different clock frequencies, the frequency of said source (FCKsource) being greater than the frequency of said channel (FCKchannel), said system comprising a transmit end and a receive end, each of said ends comprising:
   (a) a single-port RAM synchronized with the clock of said source;
   (b) a FIFO memory coupled to the output of said single-port RAM at the transmit end and coupled to the input of said single-port RAM at the receive end; and
   (c) priority logic which controls writing and reading to said single-port RAM from said source and channel based upon requests received from said source and said channel and which, in the event of a conflict arising from simultaneous read/write requests from said source and said channel, gives the request from the source priority access to said single-port RAM, the request from said channel being fulfilled by read/write to said FIFO memory.

3. A system for interfacing asynchronous equipment as recited in claim 2, wherein the following condition must be met:

$$\alpha = 1 - \beta \frac{FCK\text{channel}}{FCK\text{source}}$$

where: $\alpha = \frac{FS\text{ram}}{FCK\text{source}}$ and $\beta = \frac{FL\text{fifo}}{FCK\text{channel}}$ and FSram = RAM writing frequency
FLfifo = FIFO reading frequency.

4. A system for interfacing asynchronous equipment comprising a source and a channel operating a different clock frequencies, the frequency of said source (FCKsource) being less than the frequency of said channel (FCKchannel), said system comprising a transmit end and a receive end, each of said ends comprising:
   (a) a single-port RAM synchronized with the clock of said channel;
   (b) a FIFO memory coupled to the input of said single-port RAM at the transmit end and coupled to the output of said single-port RAM at the receive end; and
   (c) priority logic which controls reading and writing to said single-port RAM from said source and said channel based upon requests received from said source and said channel and which, in the event of a conflict arising from simultaneous read/write requests from said source and channel, gives the request from the channel priority access to said single-port RAM, the request from said source being fulfilled by read/write to said FIFO memory.

5. A system for interfacing asynchronous equipment as recited in claim 4, wherein the following condition must be met:

$$\beta = 1 - \alpha \frac{FCK\text{source}}{FCK\text{channel}}$$

where: $\alpha = \frac{FS\text{ram}}{FCK\text{source}}$ and $\beta = \frac{FL\text{fifo}}{FCK\text{channel}}$ and FSram = RAM writing frequency
FLfifo = FIFO reading frequency.

* * * * *